United States Patent

Shore

[15] 3,704,338
[45] Nov. 28, 1972

[54] BOOK FOR TEACHING READING

[72] Inventor: Robert Eugene Shore, Box 296, Kentfield, Calif. 94904

[22] Filed: Nov. 13, 1970

[21] Appl. No.: 89,194

[52] U.S. Cl. .......................................35/35 E, 35/73
[51] Int. Cl. .............................................G09b 17/00
[58] Field of Search........35/35 R, 35 E, 35 H, 62, 70, 35/66, 73, 36, 37; 281/38, 39

[56] References Cited

UNITED STATES PATENTS

| | | | |
|---|---|---|---|
| 3,326,557 | 6/1967 | Berendt | 35/73 X |
| 3,024,541 | 3/1962 | Byrum | 35/35 H |
| 1,479,423 | 1/1924 | Barton | 35/73 |
| 2,682,118 | 6/1954 | Larsen | 35/37 UX |
| 2,862,309 | 12/1958 | Hellen | 35/35 E |
| 1,414,849 | 5/1922 | Williams | 35/35 E X |
| 3,131,488 | 5/1964 | Slater | 35/70 X |

FOREIGN PATENTS OR APPLICATIONS

| | | | |
|---|---|---|---|
| 380,620 | 9/1932 | Great Britain | 35/35 H |
| 395,595 | 12/1965 | Switzerland | 35/35 H |

Primary Examiner—Harland S. Skoquist
Attorney—Flehr, Hohbach, Test, Albritton & Herbert

[57] ABSTRACT

An educational device and method for the individualized teaching of reading employing a series of page panels each including elongated word-well slots. Pieces depicting letters are placed into the slots to form words and sentences corresponding to a learner's own speech and mental image of the story idea. The learner illustrates his talk placed in the slots by drawing on a disposable sheet mounted onto each panel. When the child expresses a sequence of mental images, one per panel, the panels are inked to form a book depicting an original story. The child then masters his own speech forms (talk) at the reading level. In learning to read his own speech he can more easily read what others have written.

1 Claim, 5 Drawing Figures

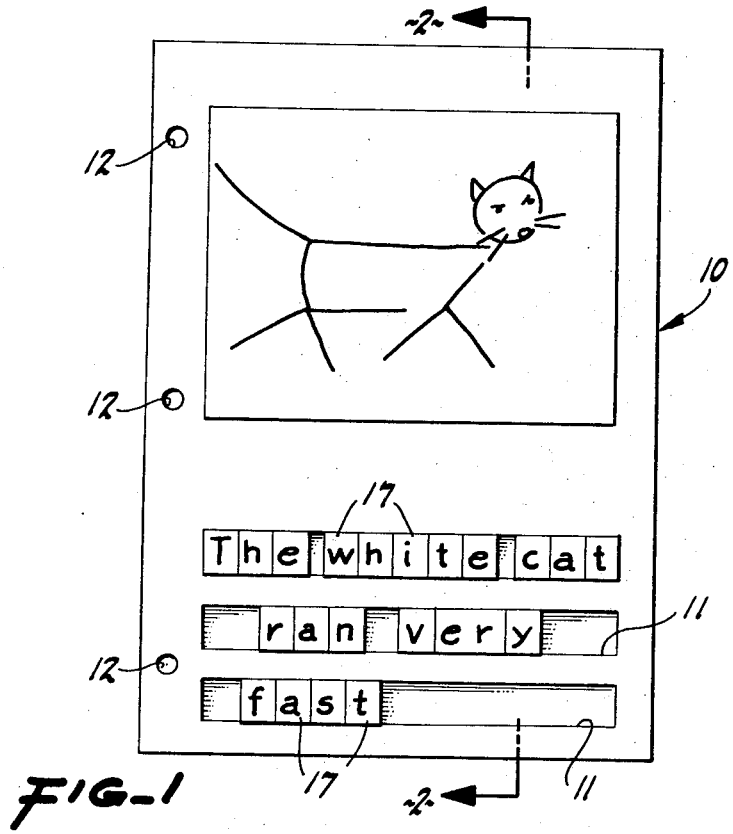
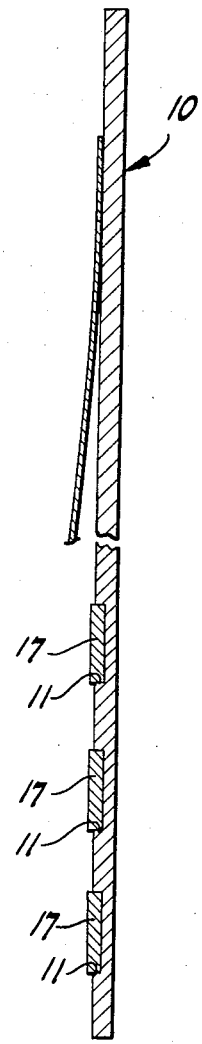
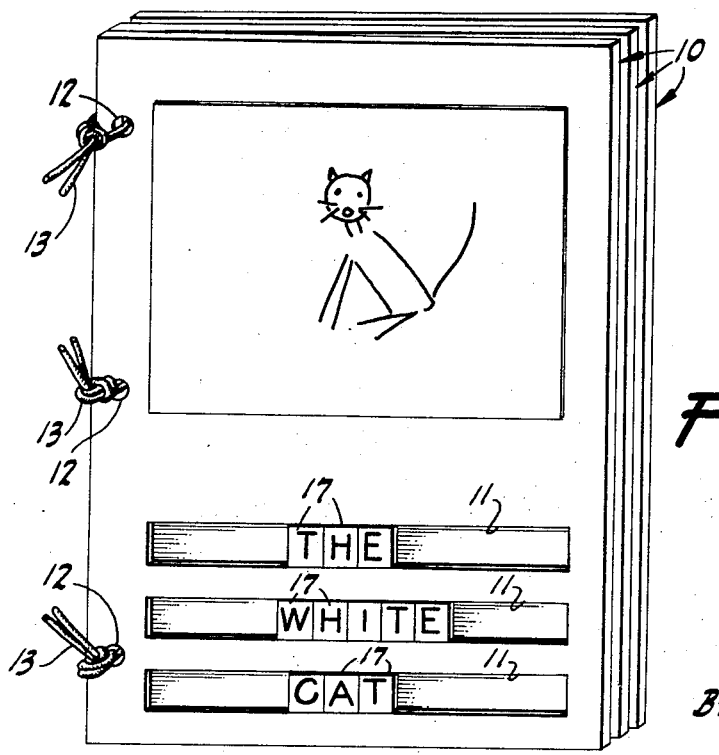
FIG.-1
FIG.-2
FIG.-3
INVENTOR
ROBERT E. SHORE

BOOK FOR TEACHING READING

BACKGROUND OF THE INVENTION

This invention relates to method and means for teaching reading on an individualized basis. It is especially appropriate for the non-reader and for minority children.

The so-called "Language-Experience" approach is well recognized as a valuable aid in the reading development of children in the four to nine age group. According to this approach the child's oral language patterns and vocabulary are used as a base for the formation of words, sentences, paragraphs, and eventually stories. Reading is thus individualized and is not hampered by the necessity of the child to simultaneously learn reading and a new vocabulary. For example, the child may illustrate a mental image with a drawing and by writing corresponding sentences and paragraphs on a page, and finally build the pages into a book containing a coherent story representative of his own speech and background.

A major drawback in the above approach is that the child's manual dexterity required for writing is generally lacking at the early stages of reading development when the program could provide the greatest assitance. One system that has been employed in an attempt to overcome this problem includes a series of cubical blocks with words on each face which are manipulated to form sentences. However, this system is relatively inflexible since it is limited by practicalities of space in the extent of the available vocabulary pool. Furthermore, there is no opportunity to construct individual page panels for the formation of a book containing a central theme or story.

SUMMARY OF THE INVENTION AND OBJECTS

In accordance with the present invention, an educational device is provided to teach reading which comprises one or a series of page panels having a series of elongated, spaced apart, parallel, adjacent word-well slots. A plurality of moveable, generally flat pieces depicting letters or combinations thereof are provided of a size and shape which will fit securely into the slots to form words of variable length. Each slot corresponds to a line of writing. A disposable drawing sheet is mounted upon a rectangular flat supporting area on the slot side of the page panel by adhesive.

According to the teaching technique, the child draws a picture on the sheet mounted to the page panel and then fits a number of the aforementioned letter pieces into the word slots in a selected ordering spacing to form lines of words expressing the mental image in the learner's own speech (talk); the order may be reversed so the letter pieces are used first and then the picture is made. When the child's mental abilities have developed to an extent that he can combine various separate mental images into a story, he may form a series of such page panels and bind them into a book which he then masters.

These letters and groups of letters function as phonemes and morphemes in this invention. The Language-Experience approach does not separate these linguistic elements.

It is a general object of the invention to provide a method and means for teaching reading according to the Language-Experience approach which overcomes the above deficiencies in the present practice of this approach.

It is a further object of the invention to provide an improved individualized teaching technique in which a child may employ his own vocabulary as a base for the formation of a story.

It is a further object of the invention to provide a method and means of the above type which a child may illustrate a mental image with a drawing and by the formation of a sentence on the same page before he has the manual dexterity to write the sentence.

It is a further object of the invention to provide a series of page panels of inexpensive construction provided with slots for the placement of pieces depicting letters and groups of letters selected from a large supply.

Other and further objects of the invention will be apparent from the following description taken in conjunction with the accompanying drawings.

BRIEF DESCRIPTION OF DRAWINGS

FIG. 1 is a front view of a page panel according to the invention with a series of letter pieces in place.

FIG. 2 is a side cross-sectional view of a page panel illustrated in FIG. 1 taken along the line 2—2.

FIG. 3 is a book comprised of a series of page panels as illustrated in FIG. 1.

DETAILED DESCRIPTION OF THE PREFERRED EMBODIMENTS

Figure 4:
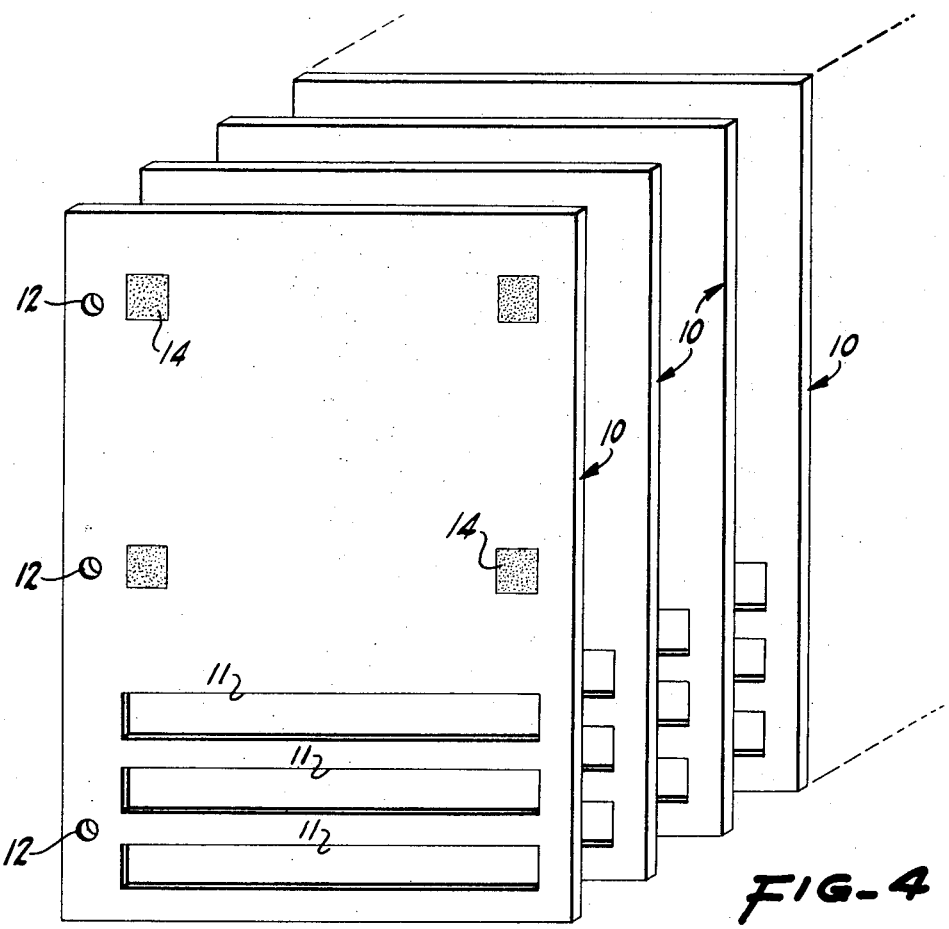
FIG. 4 is a view in perspective showing individual page panels utilized to form the book of FIG. 3.
Figure 5:
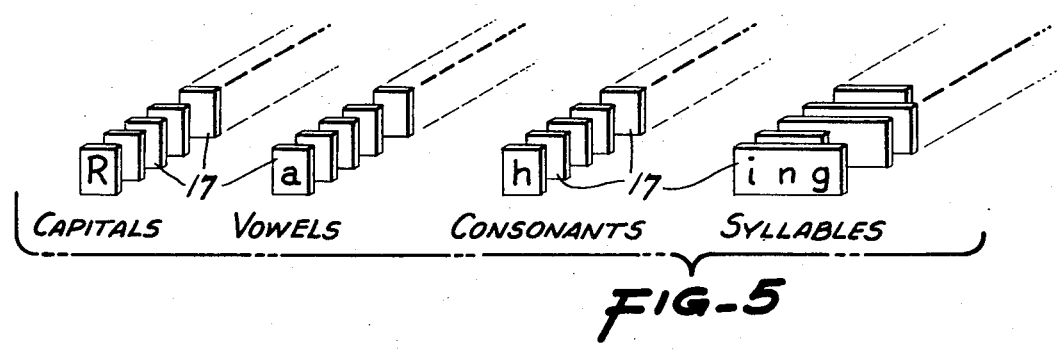
FIG. 5 is a representation of a source of individual letter pieces.

In referring to the drawing, a page panel 10 is provided in the form of a flat rectangular board suitably of a rigid material such as composition hardboard sold under the trademark "Masonite" or of a rigid or semi-rigid polymeric material. Each page panel includes a series of elongated word-well slots 11 in generally spaced apart parallel relationship. These slots may be of a recess type as best illustrated in FIG. 2 or may extend completely through the page panel. Each panel additionally includes a plurality of holes 12 for interlinking of the page panels in an order as will be explained hereinafter by means of suitable tying means such as tie strings 13.

Mounting means such as adhesive 14 is provided for mounting disposable drawing sheets 16 suitably of paper onto the face of each page panel on the same side as slots 11. In the embodiment illustrated in FIG. 4, adhesive 14 is formed of a conventional water-soluble paste freshly applied below the corners of each drawing prior to mounting removed after demounting by washing. In another embodiment not shown, strips of adhesive may be permanently mounted to the same surface so that drawing sheets 16 may be detachably mounted to the page panels.

Separate supplies of generally flat rectangular pieces 17 are provided of a size and shape for placement into word-well slots 11 wherein they are retained by frictional engagement. Pieces 17 are typically formed of wood, pressed hardboard, or plastic rectangles imprinted with either letters or combinations of the same. For ready insertion and good retention of the pieces into the well, the pieces may be of a flexible material such as an elastomeric polymer so that they are bent by pressure at their upper and lower portion and expand into engagement upon pressure release. These pieces are placed into individual containers to provide a ready stock of letters (phonemes and morphemes) and syllables (morphemes: word bases, prefixes, suffixes, and word-form changes [inflections]). The individual containers may be further segregated so that individual containers are limited to groups including, for example, capital letters, vowels, and consonants. A child may form words by placing pieces 17 side by side in slots 11.

Referring to FIG. 2, it is apparent the pieces are in substantially the same plane as page panel 10 after placement in the slots. This facilitates the formation of a book of relatively small depth.

Employing the aforementioned structure, pieces 17 may be arranged to form words of variable length with spaces therebetween so that each slot with letters in place may form a line of writing as shown in FIG. 1. Referring to an individual page panel, the child's natural sequence is to form a mental image, and then form a series of words into a sentence by placement of the pieces into the slots, after which he illustrates same by drawing as on sheet 16. After a certain amount of experience with individual mental images or individual page panels, the child may link a series of such images to form a series of page panels of the aforementioned type which may be bound together in a loose-leaf fashion to form a book as illustrated in FIG. 3. Upon completion of the book, the child may learn the basic concepts of reading in sentence form by mastering the book. Thereafter, the learning cycle has been completed and so the individual page panels may be stripped for the formation of another book. Each page panel may be used repetitively, only limited by the structural strength of the same. After usage, the letters are removed by simply inserting an instrument or fingers into the slots to force pieces 17 out and by pulling the drawing sheets off the panel. For best repeatability, the adhesive portions are of a water-soluble paste which may be washed completely clean prior to the placement of a new sheet upon new paste.

The dimensions of a typical page panel may be 9½ inches by 13 inches by one-fourth inch deep, with the word-well slots at a depth of one-eighth inch and three-fourths inches wide.

It is important to emphasize that the aforementioned educational device enables a reader at a beginning level or beyond to record original stories by utilizing his own speech. These stories, once recorded, are then mastered by the learner. A primary disadvantage of the Language-Experience methodology of the prior art is the requirement of the learner to write, a difficult manipulative step for children in the early stage of reading. This is eliminated by using the teaching device of the present invention. It is apparent that this device may be used in a complete teacher-directed reading program or as an auto-instructional, recreational reading game source for young readers.

A number of auxiliary materials may be provided to assist in the learning technique performed by the foregoing educational device. For example, a picture dictionary may be used comprising a book of blank pages upon which are to be pasted pre-printed pictures with identifying words. The learner will only paste words which he can identify in his own speech repertoire. The picture dictionary will be limited to words commonly known by children in several age groups within the four to nine range.

I claim:

1. An educational device for teaching reading comprising a loose-leaf book formed of a plurality of page panels in a predetermined order, means for linking said page panels in said loose-leaf manner, each panel comprising a flat rectangular board having a series of elongated spaced-apart parallel adjacent word-well slots, a plurality of moveable generally flat pieces depicting letters or combinations thereof frictionally engaged in said word-well slots so that the top pieces are in substantially the same plane as the board, said pieces forming words of variable length, each well slot corresponding to a line of writing, and drawing sheets mounted by adhesive means to an open flat rectangular support area on the slot side of said board.

* * * * *